June 21, 1927.
R. LA FRANCE
1,633,028
MEANS FOR COOLING MOLDS
Filed June 12, 1922
2 Sheets-Sheet 1
Fig. 1
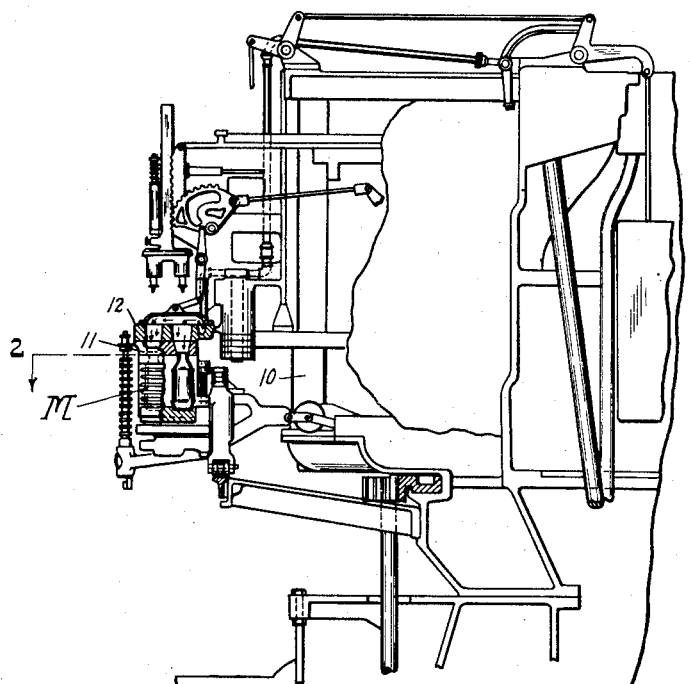
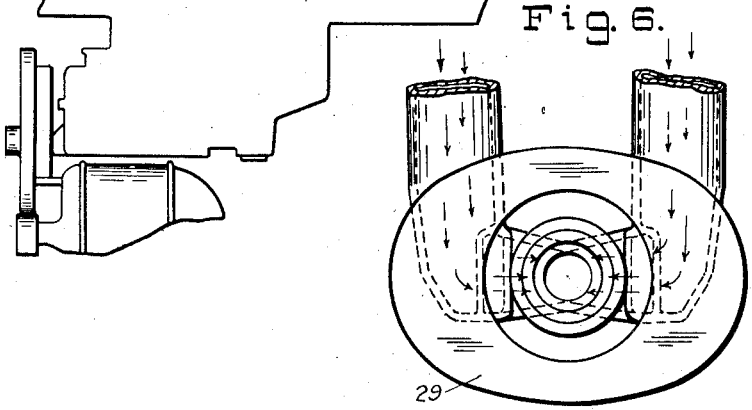
Fig. 6.
INVENTOR
R. La France,
BY J.F. Rule
His attorney June 21, 1927.
R. LA FRANCE
MEANS FOR COOLING MOLDS
Filed June 12, 1922
1,633,028
2 Sheets-Sheet 2
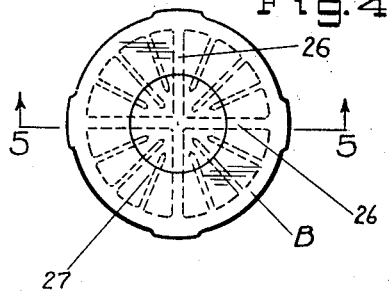
Fig. 4.
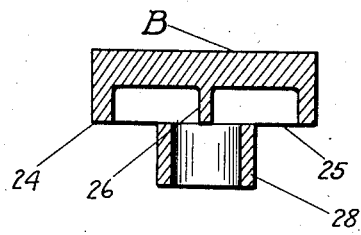
Fig. 5.
Fig. 2.
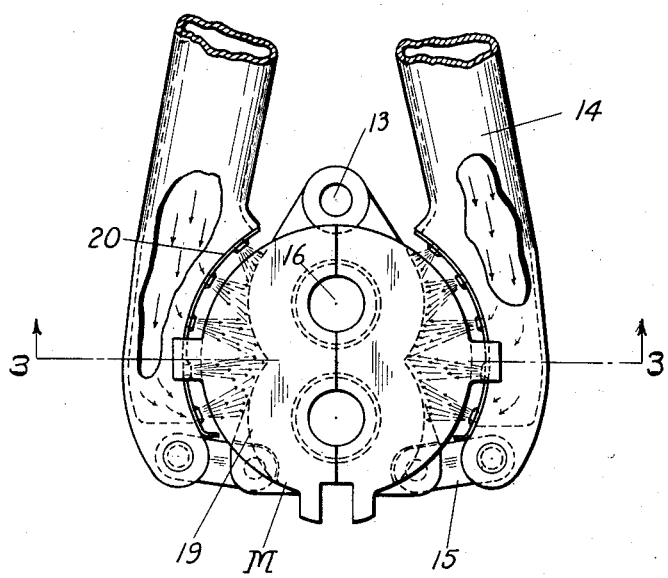
Fig. 3.
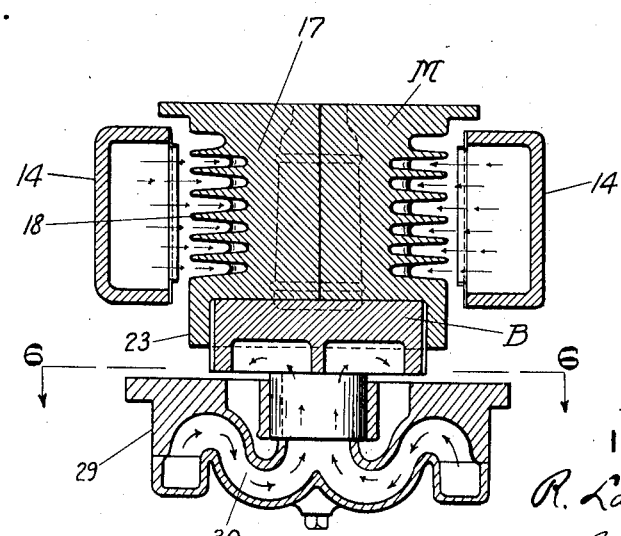
INVENTOR
R. La France,
BY J. F. Rule,
his attorney.

Patented June 21, 1927.

1,633,028

UNITED STATES PATENT OFFICE.

RICHARD LA FRANCE, OF TOLEDO, OHIO, ASSIGNOR TO THE OWENS BOTTLE COMPANY, OF TOLEDO, OHIO, A CORPORATION OF OHIO.

MEANS FOR COOLING MOLDS.

Application filed June 12, 1922. Serial No. 567,516.

My invention relates particularly to cooling means for use in connection with the molds of glass forming machines. In the formation of hollow glassware such as bottles, jars and the like, the molten or plastic glass is introduced at a high temperature into comparatively cold molds. The heat from the glass is rapidly absorbed by the molds and as the latter must be kept comparatively cool to prevent the glass from sticking and also to effect the necessary chilling or cooling of the glass, some means for cooling the molds is often employed.

In practice, it is customary to cool the molds by blowing air thereon, but this method as ordinarily practiced does not always cool the molds as quickly as desirable, and the output of the machine is curtailed owing to the comparatively slow speed necessary to prevent excessive heating of the molds.

An object of my invention is to provide a novel and efficient means for rapidly cooling the molds, thereby increasing the output of the machine by permitting it to be operated at a comparatively high speed. The invention is also particularly adapted for use in cooling plural molds,—that is, molds each having a plurality of glass-shaping cavities. The cooling of such molds has been found specially difficult, and the present invention is particularly adapted to meet this difficulty.

Other objects of the invention will appear hereinafter.

In the accompanying drawings:

Figure 1 is a fragmentary view of an Owens type of machine with the present invention applied thereto. For a full disclosure of the machine itself, reference may be had, for example, to Patent No. 1,185,687, granted in my name June 6, 1916.

Figure 2 is a plan view taken at the line 2 on Figure 1, showing a mold and the cooling arms.

Figure 3 is a sectional elevation at the plane of the line 3—3 on Figure 2.

Figure 4 is a plan view of the mold bottom.

Figure 5 is a section at the line 5—5 on Figure 4.

Figure 6 is a plan view at the plane indicated by the line 6—6 on Figure 3.

The glass blowing machine comprises a rotating mold carriage 10 on which are mounted groups of molds each including a blank mold, (not shown), a neck mold 11 and a finishing mold M. After a charge of glass has been formed in the blank mold, the latter is opened leaving the glass blank suspended from the neck mold. The finishing mold M is then closed around the blank and air under pressure supplied through a blowing head 12 to blow the blank or blanks to finished form.

The mold M comprises sections mounted for movement to and from each other about a pivot 13. The mold sections are actuated by lever arms 14 connected through links 15 to the mold sections. As shown, the mold is provided with a plurality of cavities or openings 16, permitting a number of articles to be formed simultaneously in the mold. The mold comprises a solid body portion 17 on which are formed cooling ribs 18. These ribs which are spaced at short intervals are substantially circular in outline,—that is to say, the peripheries of the ribs form substantially the circumferences of circles. The outline of the solid body portion 17 of the mold is curved as indicated by the dotted lines 19 (Fig. 2), the curves of this outline being substantially concentric with the mold cavities 16, so that the thickness of the mold wall as measured between any point on its periphery and the nearest mold cavity, is substantially uniform.

It will be observed that the diameter or width of the mold body at the section line 3—3, Fig. 2, (intermediate the mold cavities), is less than the width of the mold body as measured by a line parallel to the line 3—3 and passing through the center of a mold cavity 16. In other words, the body of the mold at the base of the ribs is reduced in diameter at the portions intermediate the mold cavities.

The arms 14 are made hollow and cooling air is supplied therethrough. These arms are formed with face plates 20 concentric with the axis of the mold. Said plates are formed with vertically disposed slots or nozzles 22 through which the air is blown directly against and between the cooling ribs 18. Heretofore, great difficulty has been experienced in cooling plural cavity molds, owing to the large mass of iron in the molds and the comparatively short time permitted for cooling. It will be noted that with the present construction, the mass of iron and thickness of the mold walls are greatly reduced as compared with a mold of circular form. Also, the cooling ribs are of the greatest depth opposite the portions of the mold between the two mold cavities, thus presenting the largest cooling area opposite the hottest portions of the mold, that is, the portions to which heat is transmitted from both mold cavities. The arrangement here shown has been found to be very effective in keeping the molds at the desired temperature.

A mold bottom B forms a closure for the lower end of the mold cavity. This bottom, as shown, is substantially circular in outline. The mold sections are provided with depending flanges or extensions 23 which when the mold is closed surround the bottom B. The mold bottom is formed with an annular depending flange 24 providing an open space 25 in the lower portion of the mold bottom. Two ribs 26 extending diametrically across the mold divide said chamber into four compartments or quadrants. Projecting inwardly from the flange 24 are radially disposed ribs 27 which, as shown in Figure 4, terminate a short distance from the ribs 26.

Formed on the under side of the mold bottom is a cylindrical extension 28 which fits in a correspondingly shaped opening in a supporting block 29. Air passages 30 lead through this block for conducting air through the cylinder 28 into the space 25 for cooling the mold bottom. The air thus admitted at the lower central portion of the mold bottom passes outward along the cooling ribs 27 and 26 and escapes through the passageway provided between the mold bottom and the block 29. The ribs 26 and 27 provide a large cooling area in contact with the rapidly moving air so that the heat is rapidly conducted from the mold bottom. The cooling air may be supplied from any suitable source and is preferably conducted from the central portion of the machine outward to the molds, as is common in this type of machine.

Modifications may be resorted to within the spirit and scope of my invention.

What I claim is:

1. A mold formed with a plurality of molding cavities and cooling ribs on the mold, the outline of the mold with the ribs thereon being substantially circular, and the body of the mold at the base of the ribs being reduced in diameter at the portions intermediate said mold cavities.

2. A mold formed with a plurality of mold cavities and having laterally projecting cooling ribs, said ribs being of greatest depth at points intermediate the mold cavities.

3. The combination of a mold, a mold bottom therefor, said bottom having a downwardly directed peripheral extension or flange, and ribs extending radially inward from said flange.

4. The combination of a mold, a mold bottom therefor, said bottom having a downwardly directed peripheral extension or flange, ribs within the space surrounded by said flange, and means for directing cooling air upward against said ribs.

5. The combination of a mold, a mold bottom therefor, said bottom having a downwardly directed peripheral extension or flange, and ribs extending radially inward from said flange, said bottom having formed thereon an additional cylindrical extension of reduced diameter projecting downward from said ribs.

6. The combination of a mold, a mold bottom therefor, said bottom having a downwardly directed peripheral extension or flange, ribs extending radially inward from said flange, said bottom having formed thereon an additional cylindrical extension of reduced diameter projecting downward from said ribs, and a supporting member provided with an opening in which said cylindrical extension is seated, said support formed with air passages through which cooling air is directed upward through said cylindrical extension.

7. In a glass forming machine, the combination of a mold formed with a series of cooling ribs on the lateral faces thereof, a bottom for said mold formed with ribs on the under surface thereof, and means for directing cooling air against said ribs.

8. In a glass forming machine, the combination of a mold formed with a series of cooling ribs on the lateral faces thereof, a bottom for said mold formed with ribs on the under surface thereof, and separate means for directing cooling air against the body of the mold and against said mold bottom.

Signed at Toledo, in the county of Lucas and State of Ohio, this 8th day of June, 1922.

RICHARD LA FRANCE.